United States Patent [19]

Knight

[11] 4,445,607

[45] May 1, 1984

[54] CLUTCH DRIVEN PLATE ASSEMBLY

[75] Inventor: Kerry G. Knight, Washington, Mich.

[73] Assignee: Borg-Warner Corporation, Chicago, Ill.

[21] Appl. No.: 326,787

[22] Filed: Dec. 2, 1981

[51] Int. Cl.³ .............................................. F16D 13/64
[52] U.S. Cl. .............................. 192/107 C; 188/250 G
[58] Field of Search ............................ 192/52, 107 C; 188/250 D, 250 E, 250 B, 250 G

[56] References Cited

U.S. PATENT DOCUMENTS

| | | | |
|---|---|---|---|
| 1,727,841 | 9/1929 | Raviolo | 192/107 C |
| 2,282,981 | 5/1942 | Jarrett | 192/107 |
| 2,477,017 | 7/1949 | Thelander | 192/107 |
| 2,534,991 | 12/1950 | Reed | 192/107 |
| 3,717,230 | 2/1973 | Hartmann | 192/107 R |
| 4,108,699 | 8/1978 | deGennes | 192/107 C X |
| 4,113,078 | 9/1978 | Maycock | 192/107 C |

*Primary Examiner*—Rodney H. Bonck
*Assistant Examiner*—James J. Merek
*Attorney, Agent, or Firm*—James A. Geppert

[57] ABSTRACT

A clutch driven plate assembly utilizing cushion springs secured to a clutch plate and having the annular friction facings bonded directly thereto without the use of rivets. Each cushion spring has an offset portion that substantially overlaps the next adjacent cushion spring with a substantial flat area available for bonding of the friction facings thereto, and the cushion springs will function to provide cushioned clutch engagement.

4 Claims, 6 Drawing Figures

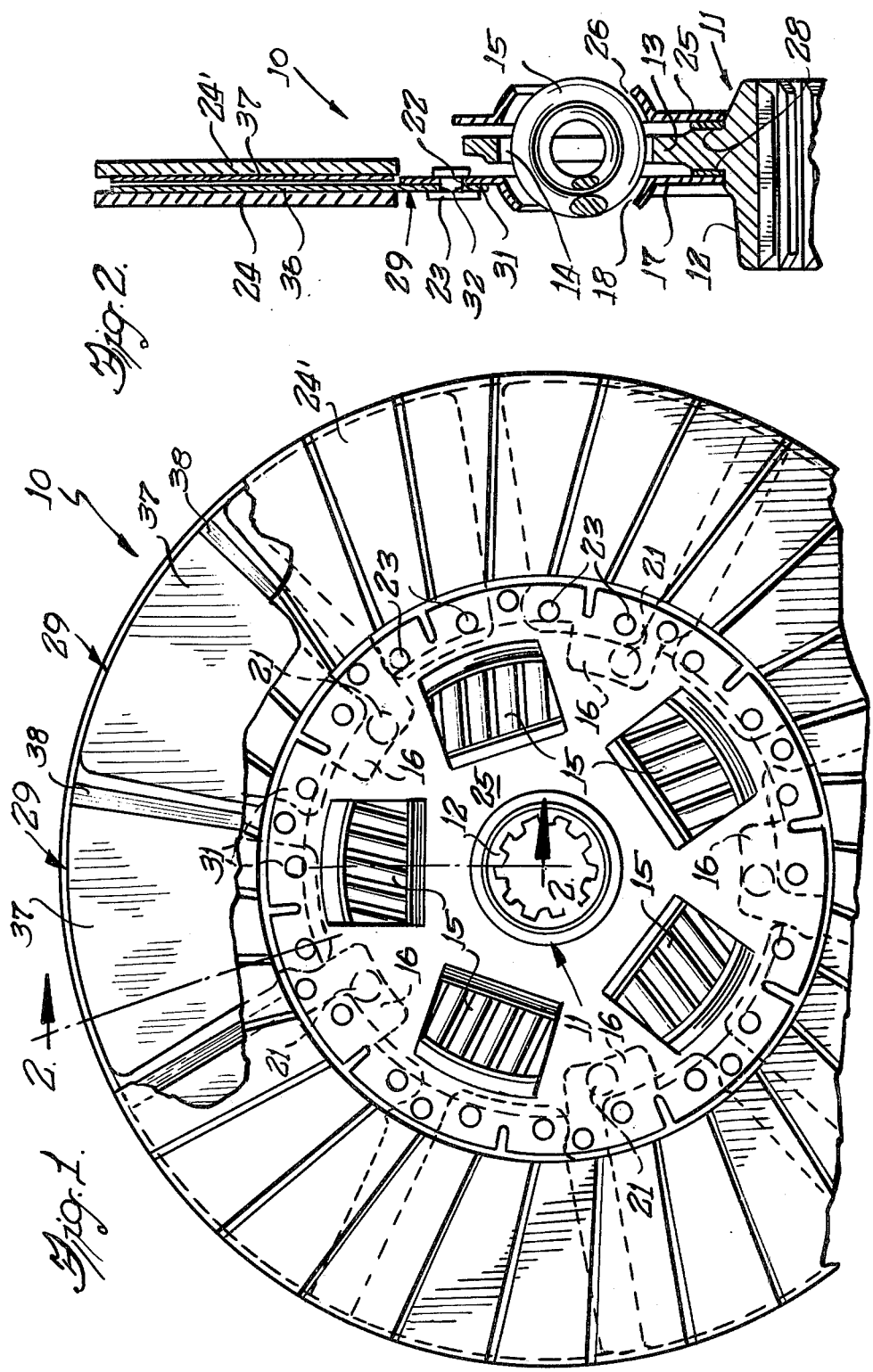

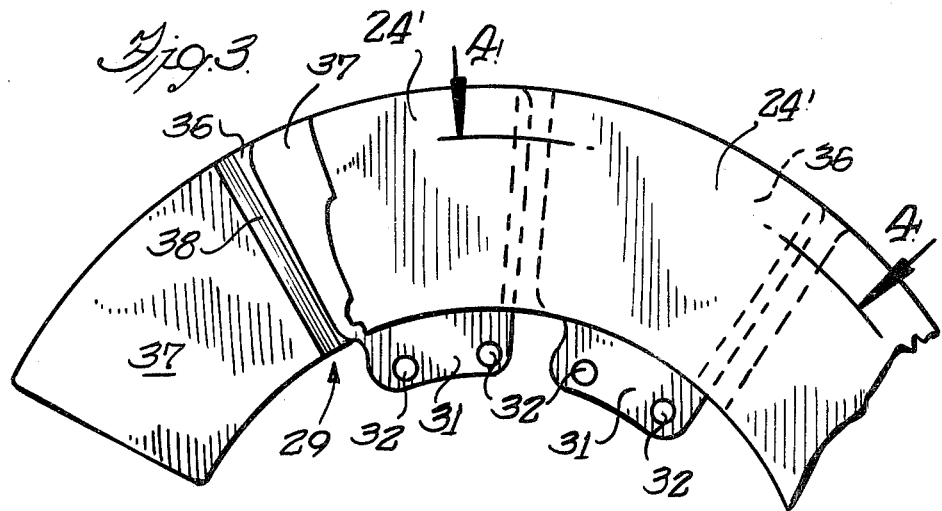
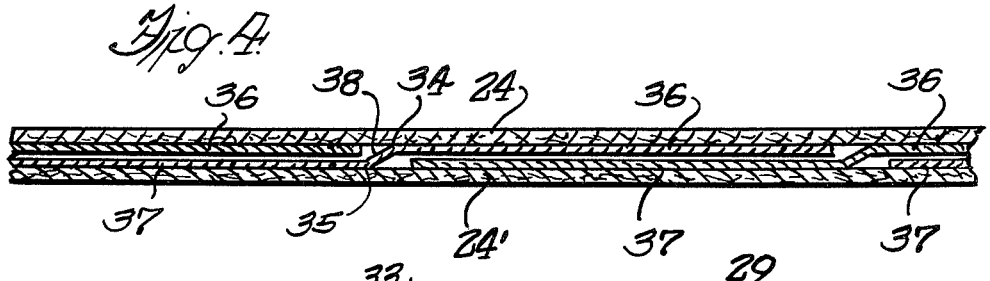
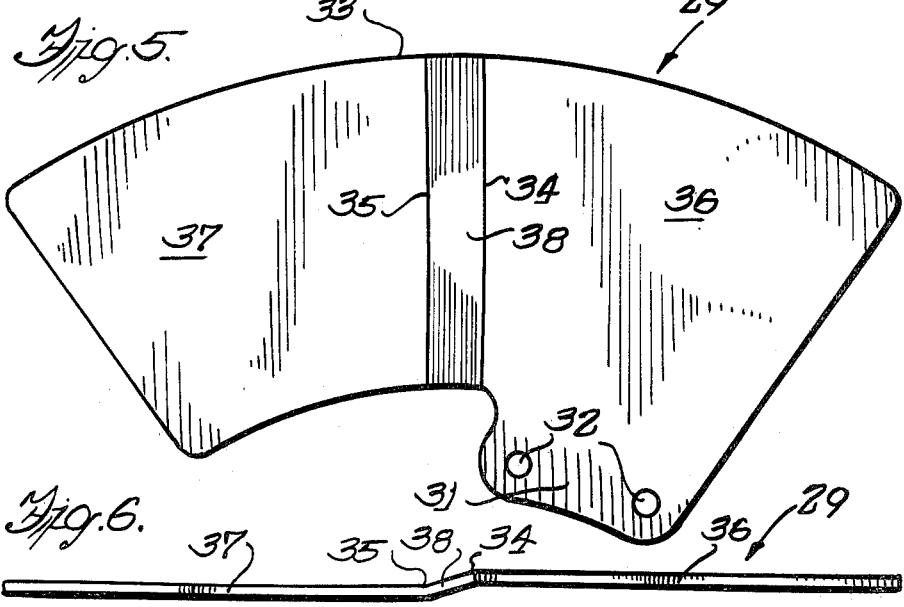

CLUTCH DRIVEN PLATE ASSEMBLY

BACKGROUND OF THE INVENTION

The present invention relates to improved cushion springs for the friction facings of a clutch plate and the securement of the facings thereto. A conventional clutch driven plate has cushion springs secured to the periphery thereof, the cushion springs carrying a pair of oppositely disposed annular friction facings riveted thereto. The cushion springs provide a limited spacing between the facings and are resilient so as to provide yieldable progressive engagement of the clutch when the pressure plate approaches and urges the facings against the flywheel.

Also, the friction facings, whether annular or segmental, require openings drilled or otherwise formed therein to receive rivets to secure the facing to the cushion spring or springs. Thus, the friction facing must be designed for a high burst strength. To add reinforcement to the facing, a separate metal backing plate is suitably secured to the raw facing back. Then the reinforced facing is drilled and riveted to the cushion springs in a conventional manner. The present invention obviates the necessity for a reinforcing plate to back the friction facing and eliminates the riveting operation.

SUMMARY OF THE INVENTION

The present invention comprehends the provision of a novel clutch drive plate assembly wherein the friction facings are adhesively bonded to the flat surfaces of the cushion springs without the necessity of drilling, riveting or clearance holes in the facing. The cushion springs provide substantial flat areas so that approximately 85% of the facing area of each annular friction facing is bonded to the cushion springs.

The present invention also comprehends the provision of a clutch driven plate assembly having novel cushion springs riveted to the clutch driven plate and providing a large area of metal reinforcement for the facings. Each cushion spring has an elongated trailing area from the anchoring tab, with the cushion spring having a central radially extending offset so that the trailing half of the spring overlaps the first half of the next adjacent spring.

Further objects are to provide a construction of maximum simplicity, efficiency, economy and ease of assembly, and such further objects, advantages and capabilities as will later more fully appear and are inherently possessed thereby.

DESCRIPTION OF THE DRAWINGS

FIG. 1 is a partial rear elevational view with portions broken away of a clutch plate assembly embodying the present invention.

FIG. 2 is a partial cross sectional view taken on the irregular line 2—2 of FIG. 1.

FIG. 3 is a partial rear elevational view of the clutch facings secured to the cushion springs.

FIG. 4 is a cross sectional view taken on the line 4—4 of FIG. 3.

FIG. 5 is a rear elevational view of a clutch cushion spring.

FIG. 6 is a top edge view of the cushion spring of FIG. 5.

DESCRIPTION OF THE PREFERRED EMBODIMENT

Referring more particularly to the disclosure in the drawings wherein is shown an illustrative embodiment of the present invention, FIGS. 1 and 2 disclose a clutch drive plate assembly 10 including a hub 11 having an internally splined barrel 12 adapted to receive the splined end of a transmission input shaft (not shown) and an integral hub flange 13 having a plurality of windows 14 for damper springs 15 and a plurality of peripheral notches 16.

A clutch plate 17 and a spring retainer plate 25 are journalled on the hub on opposite sides of the hub flange 13, the plate 17 including spring windows 18 axially aligned with the windows 14 in the hub flange, a series of openings to receive the ends of spacer pins 21, and a plurality of openings 22 adjacent the periphery for rivets 23 to secure the cushion mounting for friction facings 24, 24' to the plate. The spring retainer plate 25 also has axially aligned spring windows 26 and openings to receive the opposite ends of the spacer rivets or pins 21; the spacer pins extending through the notches 16 in the hub flange 13 to limit relative rotation between the hub 11 and the connected plates 17 and 25. Friction washers 28 may be interposed between the plates 17 and 25 and the hub flange 13 (FIG. 2) to provide friction drag on the damping operation of the assembly.

A plurality of cushion springs 29 (FIGS. 5 and 6) are secured to the clutch plate 17 with each having an inner anchoring portion or tab 31 with spaced openings 32 to receive the rivets 23 securing the cushion springs to the clutch plate 17 and a body portion 33 which is an elongated arcuate plate that trails the inwardly extending anchoring portion 31. The body portion 33 includes an intermediate offset portion 38 having radially extending parallel bends 34 and 35 to divide the body portion into a pair of offset flat areas 36 and 37.

When the cushion springs 29 are secured to the clutch plate 17, the anchoring portions 31 are located closely adjacent, as seen in FIGS. 1 and 3, with the flat area 36 aligned with the anchoring portion 31 of one plate substantially overlapping the offset flat area 37 of the next adjacent plate, as more clearly seen in FIG. 4. This overlapping occurs between each pair of adjacent cushion springs so that the successive flat areas 36 form a substantially continuous surface, interrupted only by the intermediate bends 34, 35 of the springs. Similarly the successive flat areas 37 form a substantially continuous surface on the opposite side of the clutch plate parallel the surface of areas 36.

An annular friction facing 24 is secured to the areas 36 solely by a suitable adhesive, such as a nitrile-phenolic type cement. Likewise, the annular facing 24' is adhesively bonded to the flat surfaces 37. This assembly eliminates the separate back plate and the drilling and riveting operations of conventional riveted facings, and the facing burst speeds are increased significantly. The facings are bonded to the cushion spring areas for up to 85% of the total available surface extent on a side of the facing. The bends 34, 35 define the offset area 38 which provides the spring cushion action for enhanced clutch engagement characteristics. The large area 36, 37 of metal backing act to reinforce the facings.

We claim:

1. A clutch driven plate assembly including a hub, a clutch plate and a pair of annular friction facings carried by the clutch plate, the improvement comprising a plurality of cushion springs secured to the clutch plate adjacent the periphery thereof, each cushion spring including an inwardly extending anchoring portion and a body portion formed by a pair of offset flat areas joined by an intermediate offset portion, the anchoring portion of each cushion spring being generally radially aligned with one flat area of the body portion and the offset flat area trailing said one flat area, said offset area of each cushion spring substantially completely overlapping the opposite flat area of the next adjacent cushion spring, each friction facing being adhesively joined to substantially the entire surface extent of one flat area of each cushion spring.

2. A clutch driven plate assembly as set forth in claim 1, in which said offset area of each cushion spring is formed of a pair of parallel bends in the body portion.

3. A clutch driven plate assembly as set forth in claim 1, in which one flat area of each cushion spring lies in a common plane, and the other offset flat area lies in a second common plane parallel to the first mentioned common plane.

4. A clutch driven plate assembly as set forth in claim 3, in which each friction facing is adhesively secured to the successive flat areas of each cushion spring over approximately 85% of the total area of the facing.

* * * * *